US006993046B1

(12) United States Patent
Hernandez-Valencia et al.

(10) Patent No.: US 6,993,046 B1
(45) Date of Patent: Jan. 31, 2006

(54) MAPPING OF BLOCK-ENCODED DATA FORMATS ONTO A BIT/BYTE SYNCHRONOUS TRANSPORT MEDIUM

(75) Inventors: Enrique Hernandez-Valencia, Highlands, NJ (US); Nevin R Jones, Palmer, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 719 days.

(21) Appl. No.: 09/688,657

(22) Filed: Oct. 16, 2000

(51) Int. Cl.
*H04J 3/16* (2006.01)
*H04B 7/216* (2006.01)
(52) U.S. Cl. ............... 370/470; 370/465; 375/268
(58) Field of Classification Search ......... 370/471, 370/472, 473, 474, 465, 466, 467, 342, 397, 370/401, 469, 470, 535; 375/268, 238; 714/759
See application file for complete search history.

(56) References Cited

U.S. PATENT DOCUMENTS

| | | | | |
|---|---|---|---|---|
| 6,122,281 A | * | 9/2000 | Donovan et al. | 370/401 |
| 6,195,355 B1 | * | 2/2001 | Demizu | 370/397 |
| 6,263,443 B1 | | 7/2001 | Anderson et al. | 713/201 |
| 6,425,107 B1 | * | 7/2002 | Caldara et al. | 714/759 |
| 6,430,201 B1 | * | 8/2002 | Azizoglu et al. | 370/535 |
| 6,636,529 B1 | * | 10/2003 | Goodman et al. | 370/469 |

FOREIGN PATENT DOCUMENTS

| | | | |
|---|---|---|---|
| EP | 0 942 569 A | | 9/1999 |
| EP | 0942569 A2 | * | 9/1999 |
| EP | XP-002176717 | * | 10/2000 |

OTHER PUBLICATIONS

B. Doshi et al. "A simple Data Link (SDL) Protocol for High-Speed Packet Network", Feb. 1999.*
U.S. Patent Application of Doshi et al., Entitled "Simple Data Link (SDL) Protocol" U.S. Appl. No. 09/039,112, filed Mar. 13, 1998.
B. Doshi, S. Dravida, E. Hernandez-Valencia, J. Anderson, and J. Manchester, "A Simple Datea Link (SDL) for High-Speed Packet Networks", Bell Labs Technical Journal, vol. 3, No. 5, Jan.-Feb. 1999.
T. Armstrong et al, "Transparent GFP Mappings for Fibre Channel and ESCON", T1X1.May 2000-197, XP002176717, Oct. 10-13,2000, Retrieved from the Internet: <URL:ftp.t1.org/Pub/T1X1/2000X15/0x151970.doc>.
Carlson et al.; PPP over Simple Data Link (SDL) using SONET/SDH with ATM-like framing; Network Working Group, Request for Comments 2823; May 2000; 1-28.
Qureshi et al.; Generic Framing Procedure ITU-T G.7041 White Paper; Agilent Technologies, Inc.; Jul. 23, 2002; 1-11.
Xilinx; LogiCORE Generic Framing Procedure v1.3; Product Specification; Apr. 28, 2005; 1-21.
Lucas Mearian; Nortel, Cisco extend Fibre Channel Traffic over Sonet; Computerworld; Mar. 25, 2003; 1-2.

(Continued)

*Primary Examiner*—Afsar Qureshi (57) ABSTRACT

A fibre channel (FC) signal representing block encoded data is applied to a block decoder, which removes the block encoding from the data. The data is then applied to a simplified data link (SDL) protocol encoder, which maps the data into an SDL protocol packet for transmission over a SONET (Synchronous Optical Network)-based transport medium.

24 Claims, 5 Drawing Sheets

OTHER PUBLICATIONS

Cisco Box Maps Fibre Channel Traffic over Sonet/SDH; CommsDesign; Sep. 8, 2003; 1.

Steve Gorshe; Transparent Generic Framing Procedure (GFP); TechOnLine; Nov. 19, 2002; 1-9.

INTEC Systems, Inc.; GFP-T Processor IP Core (GFPT); 2002; 1-4.

Scholten et al.; Data Transport Applications Using GFP; IEEE Comm. Magazine; May 2002; 96-103.

Hernandez-Valencia et al.; The Generic Framing Procedure (GFP): An Overview; IEEE Comm. Magazine; May 2002; 63-71.

Black et al.; Introduction to Digital Transport Systems; Chapter 8; Aug. 16, 2002.

P. Michael Henderson; Introduction to Optical Networks; Jan. 29, 2001; Conexant Systems, Inc.; 1-36.

D.K. Siu; SONET; http://www.techfest.com/networking/wan/dks1/dks1.htm (c.~1997).

SONET; Downloaded from Internet on Jul. 15, 2005); http://www.samhassan.com/Sonet.htm.

Doshi et al.; Simple Data Link (SDL) Protocol: An Efficient and Low Complexity Data Link Protocol for High-Speed Packet Networks; Submitted to Globecom '99 Symposium on High Speed Networks; Dec. 5-9, 1999.

* cited by examiner

MAPPING OF BLOCK-ENCODED DATA FORMATS ONTO A BIT/BYTE SYNCHRONOUS TRANSPORT MEDIUM

FIELD OF THE INVENTION

This invention relates generally to communications and, more particularly, to packet communications systems.

BACKGROUND OF THE INVENTION

Legacy data networking applications such as 10/100/1000 Mbps (millions of bits per second) Ethernet, Fiber Channel and ESCON (Ethernet, Fibre Channel and Enterprise Systems Connection) use a character/block-oriented encoding mechanism to perform word/character delineation for segregating and transporting user and control information over a shared medium. (For additional information on these various legacy data networking applications see, e.g., IEEE 802.3, "Carrier Sense Multiple Access with Collision Detection (CSMA/CD) Access Method and Physical Layer Specifications, 1998 Edition; ANSI X.3230-1994 Fibre Channel Physical and Signaling Standard (FRC-PH) and Enterprise Systems Architecture/390 I/O Interface, 1990.)

SUMMARY OF THE INVENTION

Unfortunately, we have observed that this line encoding mechanism is highly inefficient when the same information needs to be transported over a bit/byte synchronous transport medium such as a SONET/SDH (Synchronous Optical Network/Synchronous Digital Hierarchy) network (e.g., see ITU-T Recommendation G.707) or an Optical Transport Network (e.g., see ITU-T Recommendation G.709). Therefore, we propose an alternative encoding mechanism based on a variable length protocol data unit (PDU) that provides more efficient encoding for a bit/byte synchronous transport medium than the above-described block-encoded format. In particular, block encoded data is first decoded to remove the block encoding and then the unencoded data is mapped into a variable length PDU for transmission over a bit/byte synchronous transport medium.

In an embodiment of the invention, a fibre channel (FC) signal representing block encoded data is applied to a block decoder, which removes the block encoding from the data. The data is then applied to a simplified data link (SDL) protocol encoder, which maps the data into an SDL protocol packet for transmission over a SONET-based transport medium using a payload type indicator to differentiate among various payload types.

DETAILED DESCRIPTION

Figure 1:
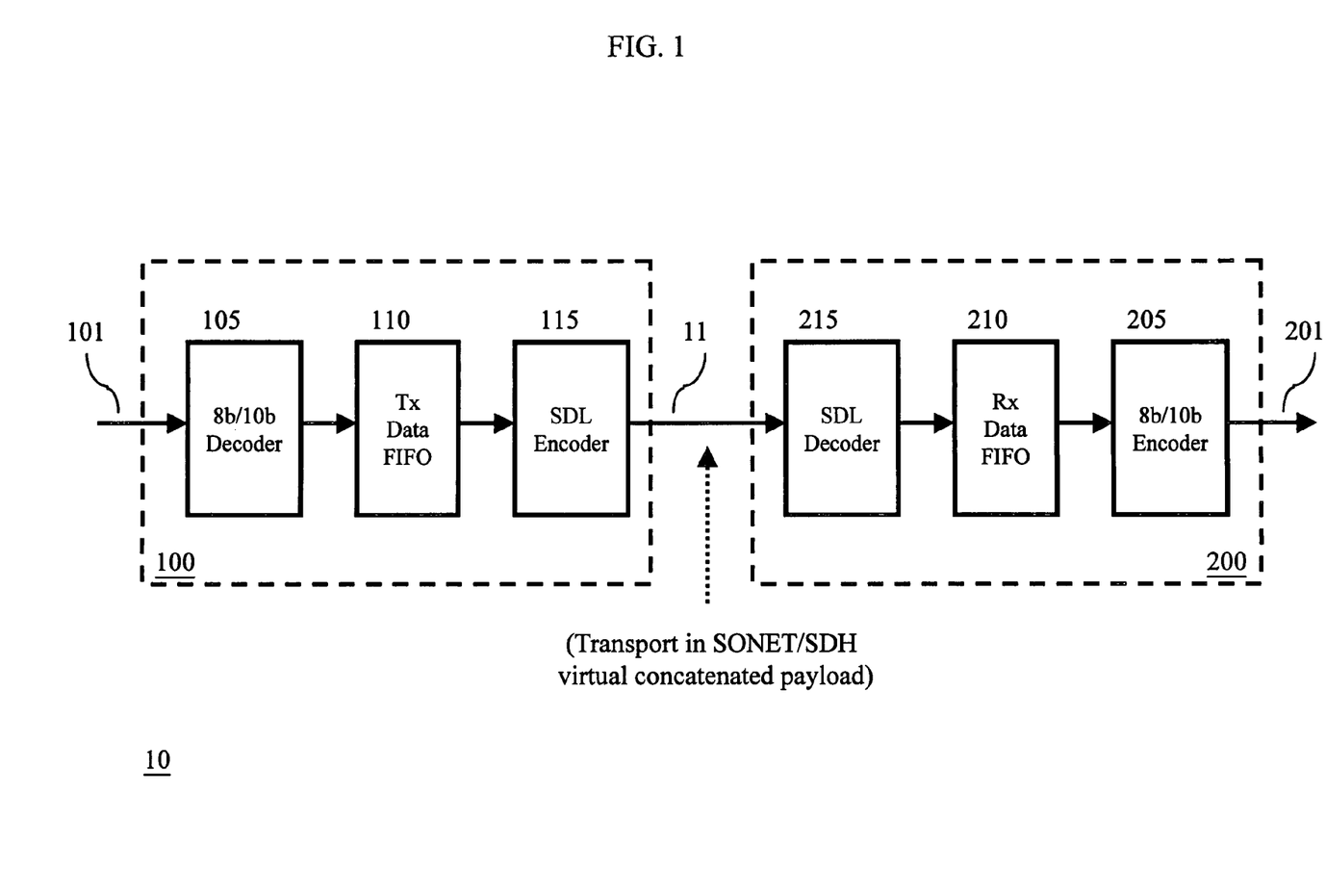
FIG. 1 shows a communications system in accordance with the principles of the invention.

The inventive concept is described in the context of information, conveyed via a Fibre Channel (FC) signal, being transported over a bit/byte-synchronous transport medium such as a SONET/SDH (Synchronous Optical Network/Synchronous Digital Hierarchy) but is not so limited. Familiarity with FC is assumed. An illustrative communications system 10 in accordance with the principles of the invention is shown in FIG. 1. Other than the inventive concept, the elements shown in FIG. 1 are well-known and will not be described in detail. For example, 8b/10b decoder 105 decodes a fibre channel signal 101 as known in the art (e.g., see the above-mentioned ANSI X.3230-1994 Fibre Channel Physical and Signaling Standard (FRC-PH)). (In Fibre Channel, data, clock, and word synchronization are carried in one signal. The FC-1 layer specifies 8b/10b coding. This coding packages eight-bit data bytes into balanced ten-bit transmission signals. That is, the number of 1s and 0s transmitted is balanced within one bit at word boundaries, whether measured over run lengths of one word or millions.) Also, although shown as single functional elements, each element (or combination of elements) may be implemented using one, or more, stored-program-control processors, memory, and appropriate interface cards (not shown in FIG. 1). Further, the inventive concept is implemented using conventional programming techniques, which, will not be described herein.

Communications system 10 comprises a transmitter portion 100 and a receiver portion 200 (described below). Transmitter portion 100 comprises 8b/10b decoder 105, transmit (Tx) data FIFO (first-in, first-out) 110 (also referred to herein as the transmit buffer) and simplified data link (SDL) encoder (or mapper) 115. Transmitter portion 100 receives an FC signal 101 and, in accordance with the invention, remaps the information conveyed by FC signal 101 into the SDL protocol for transmission over SONET/SDH transport medium 11. In particular, 8b/10b decoder 105 receives FC signal 101, which represents block encoded data. 8b/10b decoder 105 removes the block encoding from the data and provides the data to Tx Data FIFO 110. The latter provides a buffer for the data as known in the art. (It should be noted that Tx FIFO 110 is sized to find the length of the maximum size packet plus encode look ahead (Layer 1/Layer 2 (L1/L2) specific).) Tx data FIFO 110 provides the received data, in a first-in, first-out, fashion to SDL encoder 115, which formats the signal into packets based upon the simplified data link (SDL) protocol (described below). (Although known in the art, additional information on the simplified data link protocol can be found in the U.S. patent application of Doshi et al., entitled "Simple Data Link (SDL) Protocol," Ser. No. 09/039,112, filed Mar. 13, 1998.)

Figure 2:
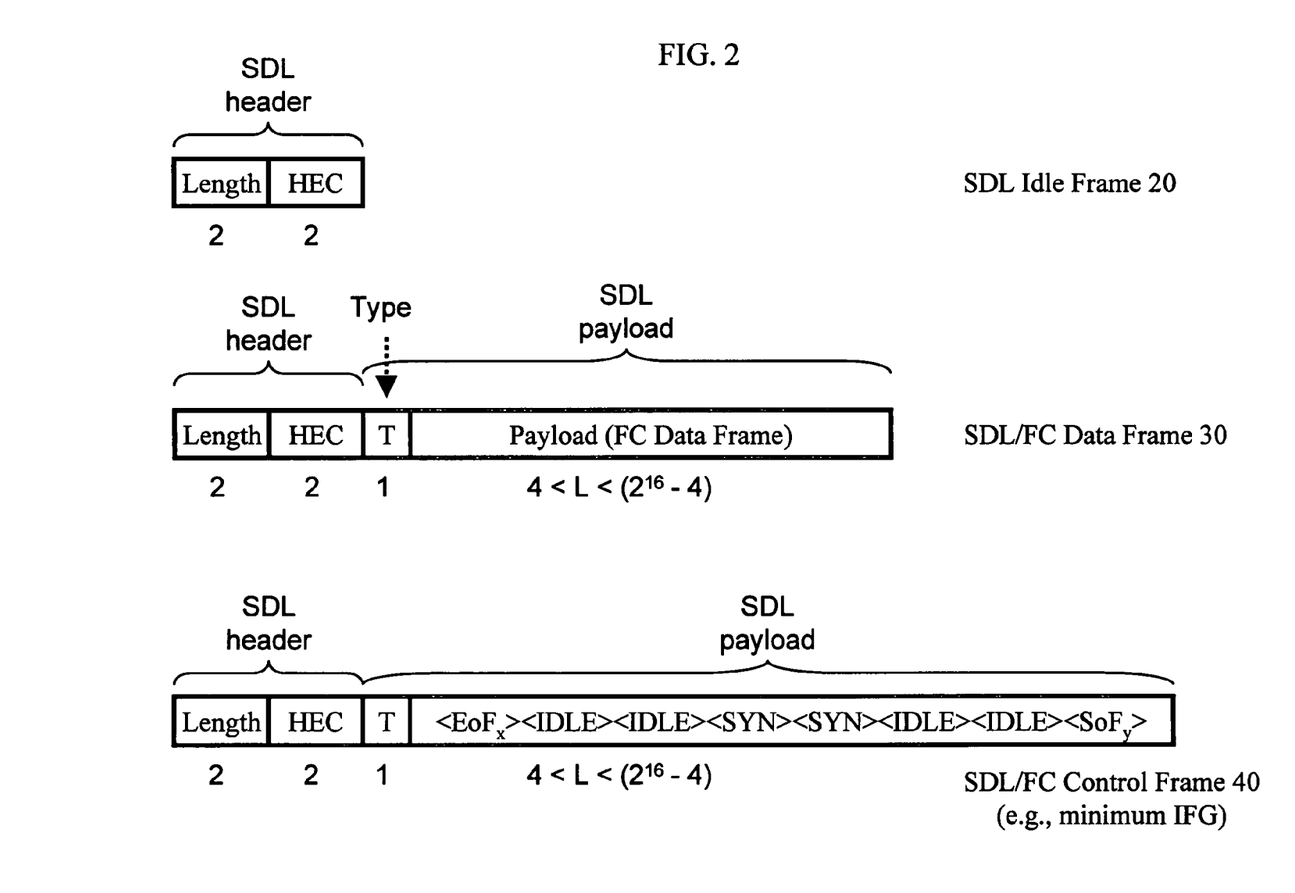
FIG. 2 shows illustrative simplified data link frame formats for conveying a fibre channel signal.

Illustrative SDL frame formats in accordance with the principles of the invention are shown in FIG. 2 for conveying an FC signal. When no information is being conveyed, an SDL idle frame 20 is used. SDL idle frame 20 comprises an SDL header, which includes a length field of two bytes and a header error check (HEC) field of two bytes. (Obviously, in this instance, the length of the SDL packet is zero.) When some form of FC information is being conveyed, the SDL packet comprises the above-mentioned SDL header portion (with an appropriate value of the length field) and an SDL payload portion comprising a type (T) field and a payload field. The type field is illustratively one byte for the purposes of this description. The type field represents whether the SDL payload field conveys an FC data frame or an FC control (CTR) frame. In the former case, an FC data frame is conveyed as shown by SDL/FC data frame 30 of FIG. 2. In the latter case, an FC control frame is conveyed as shown by SDL/FC control frame 40 of FIG. 2 (assuming a minimum inter-frame gap (IFG)). (It should be noted that for the Type (T) field, a self-correcting code may be used (shared by CTR and Data). Also, it should be observed from FIG. 2, that in the case of an FC control frame, end of frame (EoF) for the previous frame (x) (hence EoF$_x$) and start of frame (SoF) for the next frame (y) (hence SoF$_y$), in addition to idle and synchronization (SYN) ordered sets are conveyed in the SDL packet.) Although not shown, SDL encoder 115 includes processing/circuitry elements to form SONET/ SDH signal for transport over SONET/SDH medium 11.

Figure 3:
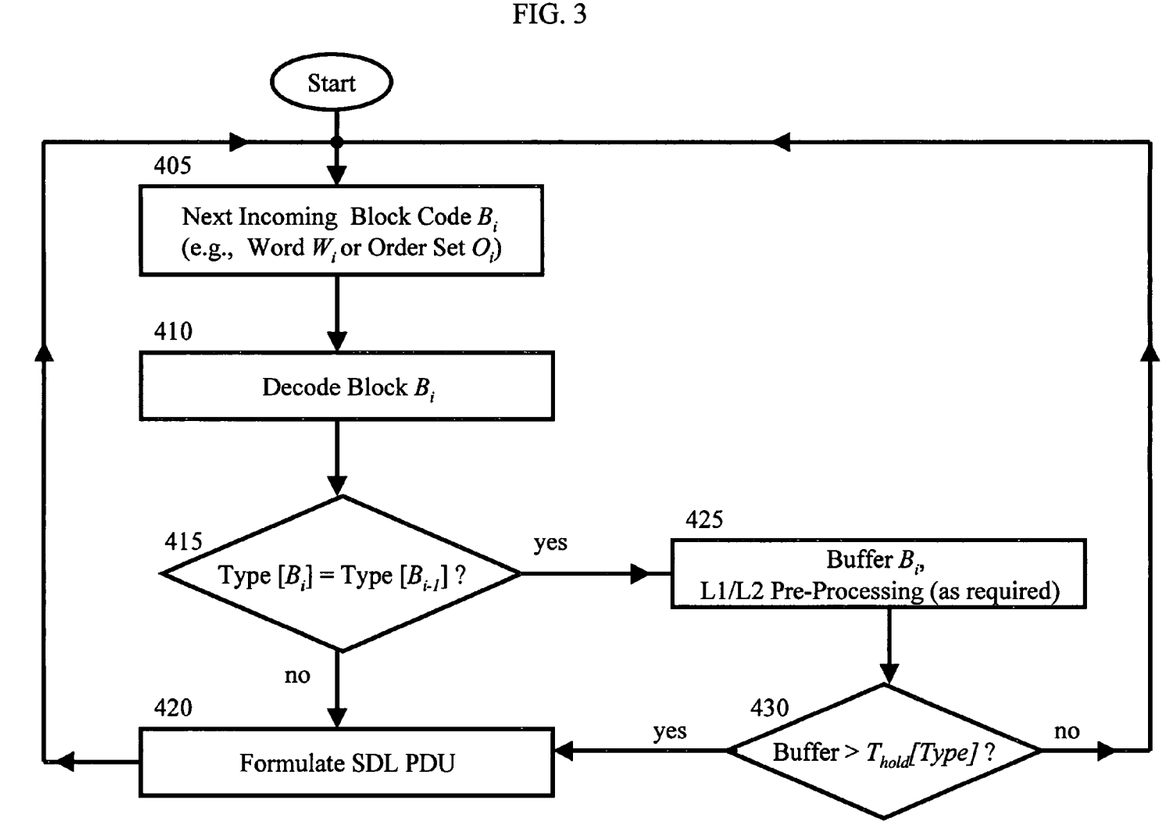
FIGS. 3 and 4 show illustrative flow charts, in accordance with the principles of the invention, for use in the transmitter portion and the receiver portion of the communications system of FIG. 1.

An illustrative method to use in transmitter portion 100 is shown in FIG. 3. In step 405, transmitter portion 100 receives the next incoming block of encoded data (block code B$_i$) conveyed via FC signal 101 (of FIG. 1) (alternatively, formatted in accordance with words, W$_i$, or Order Sets O$_i$, as known in the art). In step 410, transmitter portion 100 decodes block code B$_i$. In step 415, transmitter portion 100 evaluates whether the current received block, B$_i$, is of the same type as the previous received block, B$_{i-1}$, (assumed already in the above-mentioned transmit buffer). If the previous received block, B$_{i-1}$, is of the same type (e.g., control frame or data frame) as the current received block, B$_i$, then transmitter portion 100 pre-processes the received block B$_i$ as required (e.g., by L1/L2 requirements (not described herein)) and stores the received block, B$_i$, in the above-mentioned transmit buffer in step 425. (It should be noted that, optionally, compression may also be performed on the data at this point. Similarly, the transmitter may pre-process some of the CTR information and convey supplementary control information to the receiver via the T field. For instance, the information from the various types of ordered sets and other special control signals is highly compressible, and hence, represented with a substantially reduced set of codepoints via the T field. In this case, the receiver then recognizes such special codepoints and reconstructs the original control information accordingly.) In step 430, transmitter portion 100 checks the amount of data currently stored in the transmit buffer. If the amount of data stored in the transmit buffer is greater than a threshold for the type of data (T$_{hold}$[Type]), then transmitter portion 100 formulates an SDL PDU in step 420 for the buffered data in accordance with the type as shown in FIG. 2 (with the appropriate value for the length field), and returns to step 405 to continue to process incoming block encoded data. However, if the amount of data stored in the transmit buffer is not greater than the threshold, T$_{hold}$[Type], then transmitter portion 100 returns to step 405 to continue to process incoming block encoded data to continue to fill up the transmit buffer. Threshold values for data frames may be determined by the maximum allowed PDU size over the transport medium, for instance. Threshold values for control frames would be typically determined as a tradeoff between transport efficiency and responsiveness to the embedded control information.

On the other hand, returning to step 415, if the current received block, B$_i$, and the previous received block, B$_{i-1}$, are not of the same type (e.g., one is a control frame, the other a data frame), transmitter portion 100 formulates an SDL PDU in step 420 for the previous received block B$_{i-1}$ in accordance with the type as shown in FIG. 2. In this case, the previous received block, B$_{i-1}$, is flushed from the transmit buffer and the current received block B$_i$ is then buffered and preprocessed as required (e.g., by L1/L2 requirements (not described herein)). (Although not shown as a separate step, a step similar to step 425 is performed.)

It should be noted that if the transmit buffer (as represented by Tx FIFO 110) empties between packets, SDL Idle frames 20 are inserted (not shown in FIG. 2). Alternatively, an SDL PDU carrying a predefined control frame may be used for the same purpose. Finally, although not shown as a separate step in the flow chart of FIG. 2, transmitter portion 100 conveys the SDL PDU in a SONET/SDH signal over SONET/SDH transport medium 11.

The SONET/SDH signal conveying the SDL PDU is received (from SONET/SDH transport medium 11) by receiver portion 200, which comprises SDL decoder 215, receive (Rx) data FIFO 210 (also referred to herein as the receive buffer) and 8b/10 encoder 205. Receiver portion 200 receives the SONET/SDH signal and, in accordance with the invention, remaps the information into an FC signal. Although not shown, SDL decoder 215 includes processing/ circuitry elements to recover, from the received SONET/ SDH signal, the SDL PDU.

In particular, SDL decoder 215 recovers the information, or data, (whether representing a control frame or a data frame) from the received SDL PDU and stores the data in Rx data FIFO 210. The latter provides a buffer for the data as known in the art and provides the received data, in a first-in, first-out, fashion to 8b/10b encoder 205, which re-formats the signal into an FC compatible signal 201. (The Rx data FIFO passes the user source data complete with all inter-packet protocol information and with inter-packet gaps preserved as sent. The Rx data FIFO is sized to suit a maximum size packet arriving at the SONET/SDH payload rate and being clocked out at the protocol reference rate, as well as adsorb potential jitter and wander in clocks between the received and transmitted data signals. It should also be noted that, as between Rx data FIFO 210 and the 8b/10b encoder 205, there must be compensation for differences between the user source clock and local output clock by inserting or deleting protocol Idles within protocol rules.)

Figure 4:
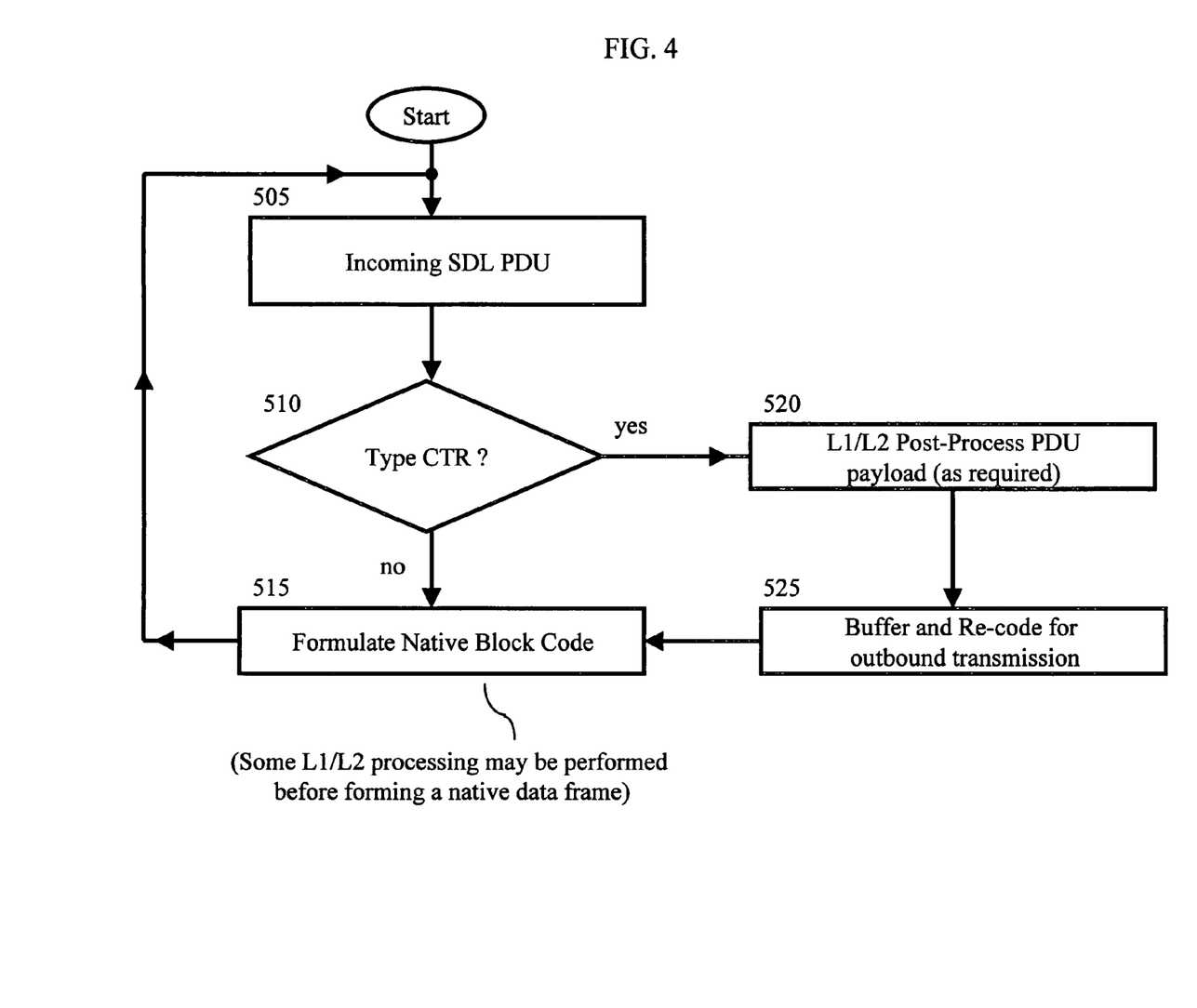

An illustrative method to use in receiver portion 200 is shown in FIG. 4. In step 505, receiver portion 200 receives the SONET/SDH signal and recovers the data from the incoming SDL PDU. In step 510, receiver portion 200 checks the payload type (the value of the T field) of the current received SDL PDU (e.g., whether a control (CTR) frame or a data frame). (Although not shown, but as mentioned earlier, receiver portion 200 discards any received SDL idle frames and simply returns to step 505.) If the current received SDL PDU conveys a data frame, receiver portion 200 formulates the native block code (in accordance with a fibre channel) and forms the FC signal 201 (of FIG. 1). (It should be noted that some L1/L2 processing may be performed before forming a native data frame. Also, if a form of compression was used in, e.g., above-mentioned step 425, then the inverse must be also performed in the flow chart of FIG. 4.) Receiver portion 200 then returns to step 505 to continue processing incoming SDL PDUs.

However, if, in step 510, the current received SDL PDU conveys an FC control frame, then receiver portion 200 goes to steps 520 and 525. In step 520, receiver portion 200 performs L1/L2 post processing of the FC control frame data (as required) and buffers and re-codes for outbound transmission in step 525. Receiver portion 200 then performs step 515 (forming FC signal 201 as noted above) and returns to step 505.

Figure 5:
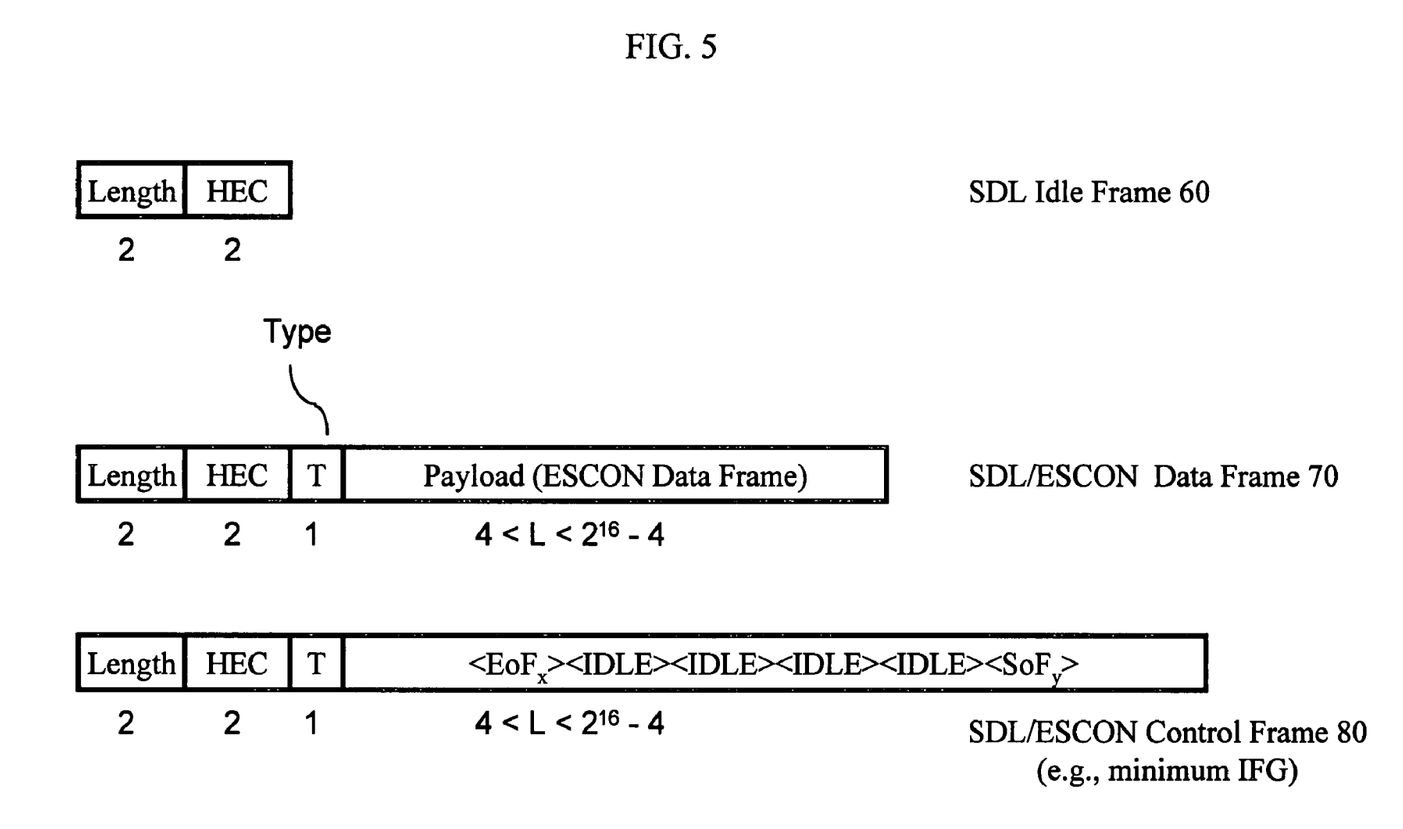
FIG. 5 shows illustrative simplified data link frame formats for conveying an Ethernet, Fibre Channel and Enterprise Systems Connection signal.

Although the inventive concept was illustrated in the context of fibre channel, the inventive concept is applicable to other types of transmission. For example, FIG. 5 shows illustrative simplified data link frame formats for conveying an Enterprise Systems Connection (ESCON) signal over a bit/byte synchronous transport medium (such as SONET/ SDH). Similar to the above described frames for FC, an SDL idle frame 60, SDL/ESCON data frame 70 and SDL/ESCON control frame 80 are shown.

As a result of the above, the inventive concept allows support of Fiber Channel and ESCON applications over SONET/SDH in such a way that minimizes transport overhead (e.g., no 8b/10b encoding over the SONET/SDH medium), minimizes L1/L2 processing, requires a minimum amount of modification to existing SDL framers and provides consistency with T1X1.5 DoS/EoS/GFP (Data over Sonet/Ethernet over Sonet/Generic Framing Procedure) proposals.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although described in the context of SDL, the inventive concept applies to any data link protocols that supports variable length PDUs such as, but not limited to, data link protocols that use flag-based delineation of variable length PDUs or a length indicator field. As an illustration, the inventive concept could utilize the Internet Protocol (IP) instead of SDL. Also, although a type field was shown added to a payload portion of the variable length packet, the type field could, equivalently, be added to other portions of the packet. In addition, the inventive concept is applicable to transport networks in general (utilizing an optical fabric and/or an electrical fabric) such as, but not limited to, PDH (Plesiochronous Digital Hierarchy); SDH (Synchronous Digital Hierarchy), Optical and other future transport network technologies.

What is claimed is:

1. A method for use in apparatus of a communications system, the method comprising the steps of:
   decoding block encoded data for removing the block encoding from the data, wherein the data represents, at least, a control frame type or a data frame type;
   mapping the data into a variable length protocol data unit (PDU) for transmission over a synchronous transport medium.

2. The method of claim 1 wherein the PDU comprises a header portion and a payload portion and includes a type field representing whether the data represents a data frame or a control frame.

3. The method of claim 1 wherein the transport medium is bit/byte synchronous.

4. The method of claim 1 wherein the transport medium is a synchronous optical network (SONET).

5. The method of claim 1 wherein the mapping step maps the data into a simplified data link (SDL) PDU.

6. The method of claim 1 wherein the decoding step further comprises the steps of:
   receiving a fibre channel (FC) signal representing the block encoded data; and
   decoding the FC signal for removing the block encoding from the data.

7. The method of claim 1 wherein the decoding step further comprises the steps of:
   receiving an enterprise systems connection (ESCON) signal representing the block encoded data; and
   decoding the ESCON signal for removing the block encoding from the data.

8. A method for use in communications apparatus, the method comprising the steps of:
   (a) receiving a signal representing block encoded data;
   (b) decoding the receiving signal for removing the block encoding from the data;
   (c) determining whether the data represents, at least, a control frame type or a data frame type;
   (d) comparing the determined type to a type of previous data, which represents at least one previously decoded block of data;
   (e) if the determined type is different from the type of previous data, formulating the previous data into a variable length payload data unit (PDU) for transmission over a synchronous transport medium; and
   (f) if the determined type is not different from the type of previous data, storing the data in a buffer.

9. The method of claim 8 wherein step (f) includes the steps of:
   determining if the buffer is full; and
   if the buffer is full, formulating the buffered data into a variable length PDU for transmission over the synchronous transport medium.

10. A method for use in apparatus of a communications system, the method comprising the steps of:
    receiving a signal from a synchronous transport medium, wherein the signal represents information conveyed in a variable length protocol data unit (PDU);
    decoding the PDU by examining a type field of the PDU, wherein the type field indicates whether data in a payload portion of the PDU represents either a data frame or a control frame; and
    block encoding the data for transmission.

11. The method of claim 10 wherein the transport medium is bit/byte synchronous.

12. The method of claim 10 wherein the transport medium is a synchronous optical network (SONET).

13. The method of claim 10 wherein the block encoding step further comprises the step of forming a fibre channel (FC) signal representing the block encoded data.

14. The method of claim 10 wherein the block encoding step further comprises the step of forming an enterprise systems connection (ESCON) signal representing the block encoded data.

15. Apparatus for use in a communications system, the apparatus comprising:
    a decoder operative on block-encoded data for removing the block encoding from the data, wherein the data represents, at least, a control frame type and a data frame type; and
    a mapper for mapping the data into a variable length protocol data unit (PDU) for transmission over a synchronous transport medium.

16. The apparatus of claim 15 wherein the PDU comprises a header portion and a payload portion and includes a type field representing whether the data represents a data frame or a control frame.

17. The apparatus of claim 15 wherein the transport medium is bit/byte synchronous.

18. The apparatus of claim 15 wherein the transport medium is a synchronous optical network (SONET).

19. The apparatus of claim 15 wherein the mapper maps the data into a simplified data link (SDL) PDU.

20. The apparatus of claim 15 wherein the decoder is operative on a fibre channel (FC) signal representing the block encoded data, and decodes the FC signal for removing the block encoding from the data.

21. An apparatus for use in a communications system, the apparatus comprising:
    means for producing a transmission frame representing data embodied in a signal conveyed over a synchronous transport medium, the transmission frame comprising:
    a variable length packet, the variable length packet comprising:
    a header, which includes at least a length field indicative of a length of the variable length packet;
    a type field representing a type of data conveyed in a payload portion of the packet, wherein the type is, at least, either a data frame or a control frame; and the payload portion for conveying the data.

22. The apparatus of claim 21 wherein the header includes an error correction field.

23. An apparatus for use in a communications system, the apparatus comprising:
   means for producing a transmission frame representing data embodied in a signal conveyed over a synchronous transport medium, the transmission frame comprising:
   a variable length packet, the variable length packet comprising:
   a header, which includes at least a length field indicative of a length of the variable length packet;
   a type field representing a type of data conveyed in a payload portion of the packet, wherein the type is, at least, either a fibre channel (FC) data frame or an FC control frame; and
   the payload portion for conveying the data.

24. An apparatus for use in a communications system, the apparatus comprising:
   means for producing a transmission frame representing data embodied in a signal conveyed over a synchronous transport medium, the transmission frame comprising:
   a variable length packet, the variable length packet comprising:
   a header, which includes at least a length field indicative of a length of the variable length packet;
   a type field representing a type of data conveyed in a payload portion of the packet, wherein the type is, at least, either an enterprise systems connection (ESCON) data frame or an ESCON control frame; and
   the payload portion for conveying the data.

* * * * *